US011606337B2

(12) United States Patent
Li et al.

(10) Patent No.: US 11,606,337 B2
(45) Date of Patent: Mar. 14, 2023

(54) FOG-ENABLED MULTIPATH VIRTUAL PRIVATE NETWORK

(71) Applicant: Wistron AiEDGE Corporation, San Jose, CA (US)

(72) Inventors: Shunge Li, Duluth, GA (US); Yan Zhang, Fort Lee, NJ (US); William Heilig, Denville, NJ (US); Kaushik Pillalamarri, Basking Ridge, NJ (US)

(73) Assignee: Wistron AiEDGE Corporation, San Jose, CA (US)

( * ) Notice: Subject to any disclaimer, the term of this patent is extended or adjusted under 35 U.S.C. 154(b) by 940 days.

(21) Appl. No.: 16/257,075

(22) Filed: Jan. 25, 2019

(65) Prior Publication Data

US 2019/0238510 A1    Aug. 1, 2019

Related U.S. Application Data

(60) Provisional application No. 62/622,791, filed on Jan. 26, 2018.

(51) Int. Cl.
*H04L 47/10* (2022.01)
*H04L 9/40* (2022.01)
(Continued)

(52) U.S. Cl.
CPC ...... *H04L 63/0272* (2013.01); *H04L 41/0803* (2013.01); *H04L 45/24* (2013.01); *H04L 47/15* (2013.01); *H04L 63/0428* (2013.01); *H04L 63/18* (2013.01); *H04W 12/08* (2013.01); *H04W 28/0231* (2013.01); *H04W 72/1263* (2013.01); *H04W 76/14* (2018.02)

(58) Field of Classification Search
USPC .......................................................... 380/33
See application file for complete search history.

(56) References Cited

U.S. PATENT DOCUMENTS

| 2014/0269327 A1* | 9/2014 | Fulknier ............... H04L 41/00 370/237 |
| 2016/0020987 A1* | 1/2016 | Wetterwald ......... H04L 41/0803 370/252 |

(Continued)

OTHER PUBLICATIONS

Kimmerlin et al, Multipath Cloud Federation, 2017, IEEE, pp. 1-6 (Year: 2017).*

*Primary Examiner* — Sakinah White Taylor
(74) *Attorney, Agent, or Firm* — Wei Wei Jeang; Grable Martin Fulton PLLC

(57) ABSTRACT

A device to provide fog-enabled multipath VPN (virtual private network) is disclosed. A first endpoint device is configured to form a fog-enabled communication path in a fog network with at least one neighboring device having at least one first IP (internet protocol) address so as to enable at least one VPN tunnel communication path, via said at least one neighboring device, between the first endpoint device and a second endpoint device with a second IP address and to enable multipath VPN tunneling between the first endpoint device and the second endpoint device. In another embodiment, a multipath VPN AP (access point) is disclosed, where the VPN AP uses at least one fog network to provide multipath VPN, and on the other hand, enables sharing of the multiple VPN by a multitude of endpoint devices that connect to the VPN AP through another fog network.

24 Claims, 7 Drawing Sheets

(51) Int. Cl.
  *H04L 45/24* (2022.01)
  *H04W 28/02* (2009.01)
  *H04L 41/0803* (2022.01)
  *H04W 72/1263* (2023.01)
  *H04W 76/14* (2018.01)
  *H04W 12/08* (2021.01)

(56) References Cited

U.S. PATENT DOCUMENTS

| | | | | |
|---|---|---|---|---|
| 2017/0277173 | A1* | 9/2017 | Bonomi | G06Q 50/04 |
| 2017/0289104 | A1* | 10/2017 | Shankar | H04L 63/166 |
| 2018/0048588 | A1* | 2/2018 | Beesley | H04L 12/4633 |
| 2018/0109428 | A1* | 4/2018 | Kattepur | H04W 4/70 |
| 2018/0183855 | A1* | 6/2018 | Sabella | H04W 52/0264 |
| 2018/0316555 | A1* | 11/2018 | Salgueiro | H04L 41/0816 |
| 2018/0316563 | A1* | 11/2018 | Kumar | H04L 41/5051 |
| 2019/0079869 | A1* | 3/2019 | Baldi | G06F 12/0817 |

* cited by examiner

FOG-ENABLED MULTIPATH VIRTUAL PRIVATE NETWORK

CROSS REFERENCE TO RELATED APPLICATIONS

The present invention claims priority to U.S. Provisional patent application, Ser. No. 62/622,791, filed on Jan. 26, 2018. The U.S. Provisional patent application is hereby incorporated by reference in its entirety.

FIELD OF THE INVENTION

The present disclosure relates to communication networks and devices, and in particular to a fog-enabled multipath virtual private network (VPN).

BACKGROUND AND RELATED ART

The Internet of Things (IoT) is the network of physical objects, devices, or "things" embedded with electronics, software, sensors, and network connectivity, which enables these "things" to exchange data, collaborate, and share resources. Fog computing or fog networking, also known as fogging, is an architecture that uses one or a collaborative multitude of end-user clients or near-user edge devices to carry out a substantial amount of storage (rather than stored primarily in cloud data centers), communication (rather than routed over the internet backbone), and control, configuration, measurement and management (rather than controlled primarily by network gateways such as those in the LTE core). Fog networking supports the Internet of Things, in which most of the devices that we use on a daily basis will be connected to each other. Examples include mobile phones, wearable devices, connected vehicles, augmented reality devices, and appliances.

BRIEF SUMMARY OF THE INVENTION

A device to provide fog-enabled multipath VPN is disclosed. According to an embodiment of the present invention, a first endpoint device is configured to form a fog-enabled communication path in a fog network with at least one neighboring device having at least one first IP (internet protocol) address so as to enable at least one VPN tunnel communication path, via said at least one neighboring device, between the first endpoint device and a second endpoint device with a second IP address and to enable multipath VPN tunneling between the first endpoint device and the second endpoint device. The first endpoint device has at most one network interface being directly IP addressable from the second endpoint device. The multipath VPN tunnel between the first endpoint device and the second endpoint device now comprises said at least one fog-enabled communication path and at least one second VPN tunnel communication path. Accordingly, two or more paths for VPN tunneling between the first endpoint device and the second endpoint device become available due to the present invention.

Said at least one second communication path may correspond to a direct (or fog-free) communication channel between the first endpoint device and the second endpoint device or another fog-enabled communication path in a fog network via at least one neighboring device having at least one IP address.

In one embodiment, the first endpoint device can be further configured to measure network characteristics of a target path and pass path information associated with the target path to a scheduler for more intelligent scheduling. For example, the first endpoint device can be configured to schedule traffic among multiple paths associated with the multipath VPN tunnel according to the path information. The path information may comprise fog networking protocols, fog node throughput, path latency, battery consumption, environment parameters such as temperature or humidity, or a combination thereof.

A method to provide fog-enabled multipath VPN is also disclosed. According to this method, a source endpoint device is configured to form a fog-enabled communication path in a fog network with at least one neighboring device having at least one first IP address, wherein the source endpoint device has at most one network interface being directly IP addressable from a sink endpoint device. At least one VPN tunnel communication path is established, via said at least one neighboring device, between the source endpoint device and the sink endpoint device with a second IP address. The multipath VPN tunnel between the source endpoint device and the sink endpoint device is established, where the multipath VPN tunnel between the source endpoint device and the sink endpoint device comprises said at least one VPN tunnel communication path and at least one second VPN tunnel communication path. Traffic is then delivered from the source endpoint device to the sink endpoint device through the multipath VPN tunnel.

In yet another embodiment of the present invention, a device to provide fog-enabled multipath VPN AP (access point) is disclosed. According to this embodiment, said first endpoint device can further be configured to act as a VPN AP (access point). According to this embodiment, at least one computing device is connected to a first endpoint device through a first fog network and configured to form a fog-enabled communication path in a second fog network with at least one neighboring device having at least one first IP address so as to enable at least one fog-enabled communication path, via said at least one neighboring device, between the first endpoint device and a second endpoint device with a second IP address and to enable multipath VPN tunneling between the first endpoint device and the second endpoint device. The first endpoint device has at most one network interface being directly IP addressable from the second endpoint device. The multipath VPN tunnel between the first endpoint device and the second endpoint device now comprises said at least one fog-enabled communication path and at least one second VPN tunnel communication path. Accordingly, two or more paths for VPN tunneling between the first endpoint device and the second endpoint device become available and are shared by at least one computing device via the first fog network due to the present invention.

One or more non-transitory computer-readable and writeable media having computer executable code stored thereon for the above devices to implement the embodiments of the present invention is also disclosed.

DETAILED DESCRIPTION OF THE INVENTION

Figure 1:
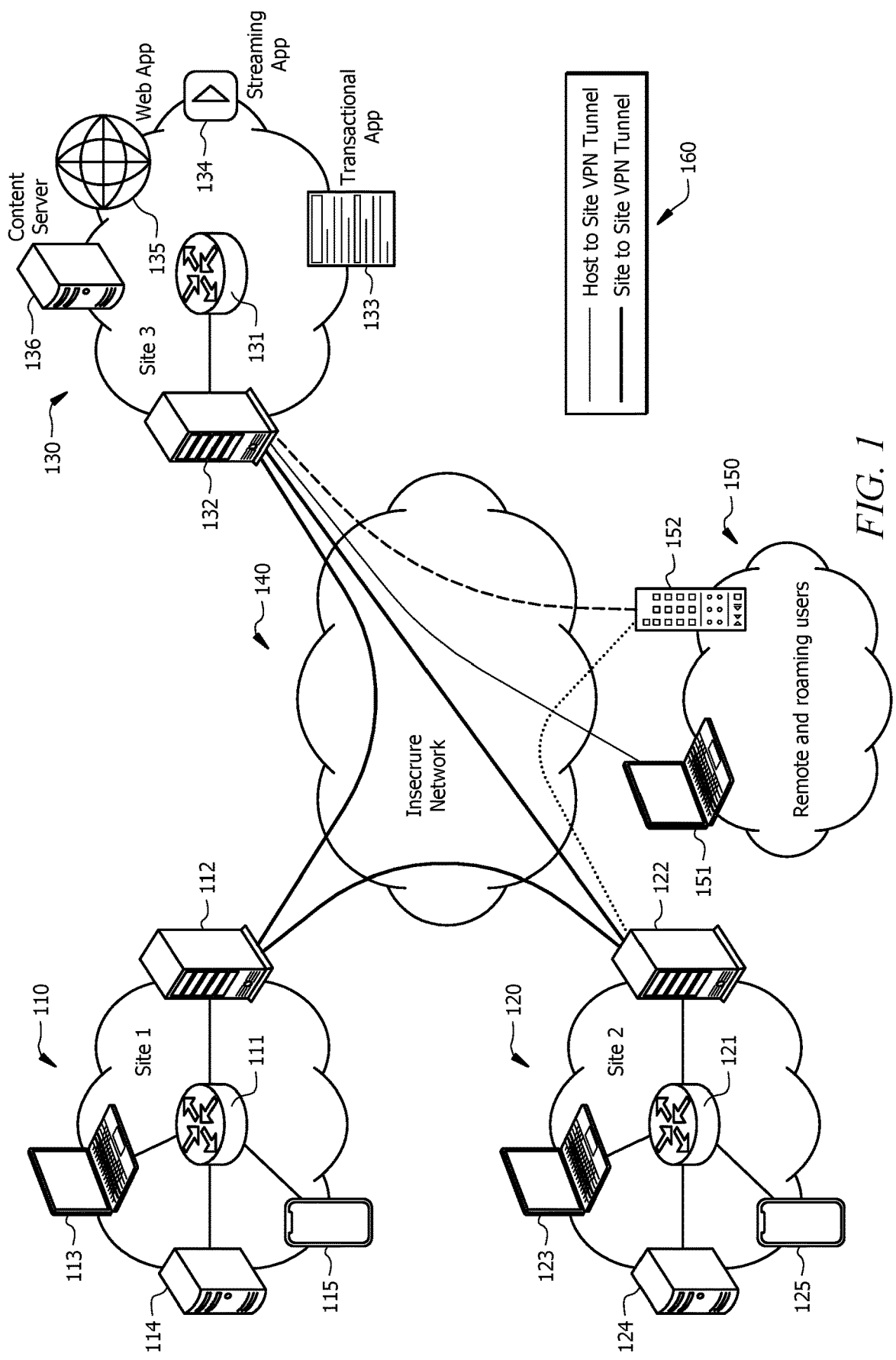
FIG. 1 illustrates a conventional VPN network architecture.

The following description is of the best-contemplated mode of carrying out the invention. This description is made for the purpose of illustrating the general principles of the invention and should not be taken in a limiting sense. The scope of the invention is best determined by reference to the appended claims.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

In the description like reference numbers appearing in the drawings and description designate corresponding or like elements among the different views.

Tunneling technology has been in existence for several decades. One of the most popular uses of tunneling technology is the Virtual Private Network (VPN), which is widely adopted by enterprises as well as consumers who seek secure connections over insecure networks such as the Internet to safeguard business and personal data transmissions. Another popular application of VPN technology is to enable access to geographically restricted sites and contents. VPN tunneling is the transmission of data intended for use within a private network through a public network in such a way that the routing nodes in the public network are unaware that the transmission is part of a private network. VPN tunneling is generally done by encapsulating the private network data and protocol information within the public network transmission units so that the private network protocol information appears to the public network as data. Accordingly, VPN tunneling allows the use of the Internet, which is a public network, to convey data on behalf of a private network. With ever-increasing cyber-threats and security breaches, VPN service has seen a steady and rapid growth in terms of number of subscriptions as well as revenues in recent years. Despite the proliferation of various VPN services, however, they all suffer from degraded performance due to overhead from added security. In addition, conventional VPN tunnels are built over a single communication path between two endpoints (hosts and/or networks). If an underlying communication path experiences network congestion or disconnection, the VPN service is disrupted.

FIG. 1 illustrates an example of conventional VPN network architecture, where multiple private networks (110, 120 and 130) as well as remote hosts (150) are connected through an insecure network (140). The private network at Site 1 includes a network server 112, a notebook 113, a desktop 114 and a smartphone 115 connected via a router 111. The private network at Site 2 includes a network server 122, a notebook 123, a desktop 124 and a smartphone 125 connected via a router 121. The private network at Site 3 includes a network server 132, a notebook 113, a Transactional App 133, a Streaming App 134, a Web App 135 and a Content Server 136 connected via a router 131. The remote and roaming users include a notebook 151 and a smart phone 152. The Site to Site VPN tunnels are shown as thick lines while the Host to Site VPN tunnels are shown as thin lines (160) in FIG. 1. While a set of particular hosts are shown in each site as examples, each site may comprise more or less hosts in practice.

As shown in FIG. 1, there are two typical types of VPN setup: (1) network to network (i.e., the connections among the 3 Sites); and (2) host to network (i.e., host 152 and host 151 to Site 3), where a host can be a smart device such as a PC, smartphone, a smart TV, etc. In the first VPN setup, both networks (i.e., Sites 1 and 2) are at a customer's sites whereas in the second VPN setup, the network end (i.e., Site 3) usually resides in the data centers of a VPN service provider. In FIG. 1, host 152 corresponds to a roaming device (e.g. a smartphone), which may be connected to different servers depending on various conditions such as user location or network loading. The dash-line path between device 152 and Site 2 represents the host to network connection at another location or time instance.

Multipath VPN tunneling technology was recently developed to enable a greater degree of connectivity, security, as well as performance in data transmission across insecure networks:

1. With multiple communication paths, VPN service can still be maintained even though some (not all) communication paths experience problems transmitting data. If some communication paths fail or get congested, traffic can still be routed through other path(s), mitigating communication failure or congestion.
2. With multiple communication paths, encrypted data can be split and sent across multiple paths. If some paths and/or even cryptographic keys are compromised, data will still be protected during transmission.
3. With multiple communication paths, additional network bandwidths are available for use during data transmission, making it possible to achieve higher overall network throughputs.

Figure 2:
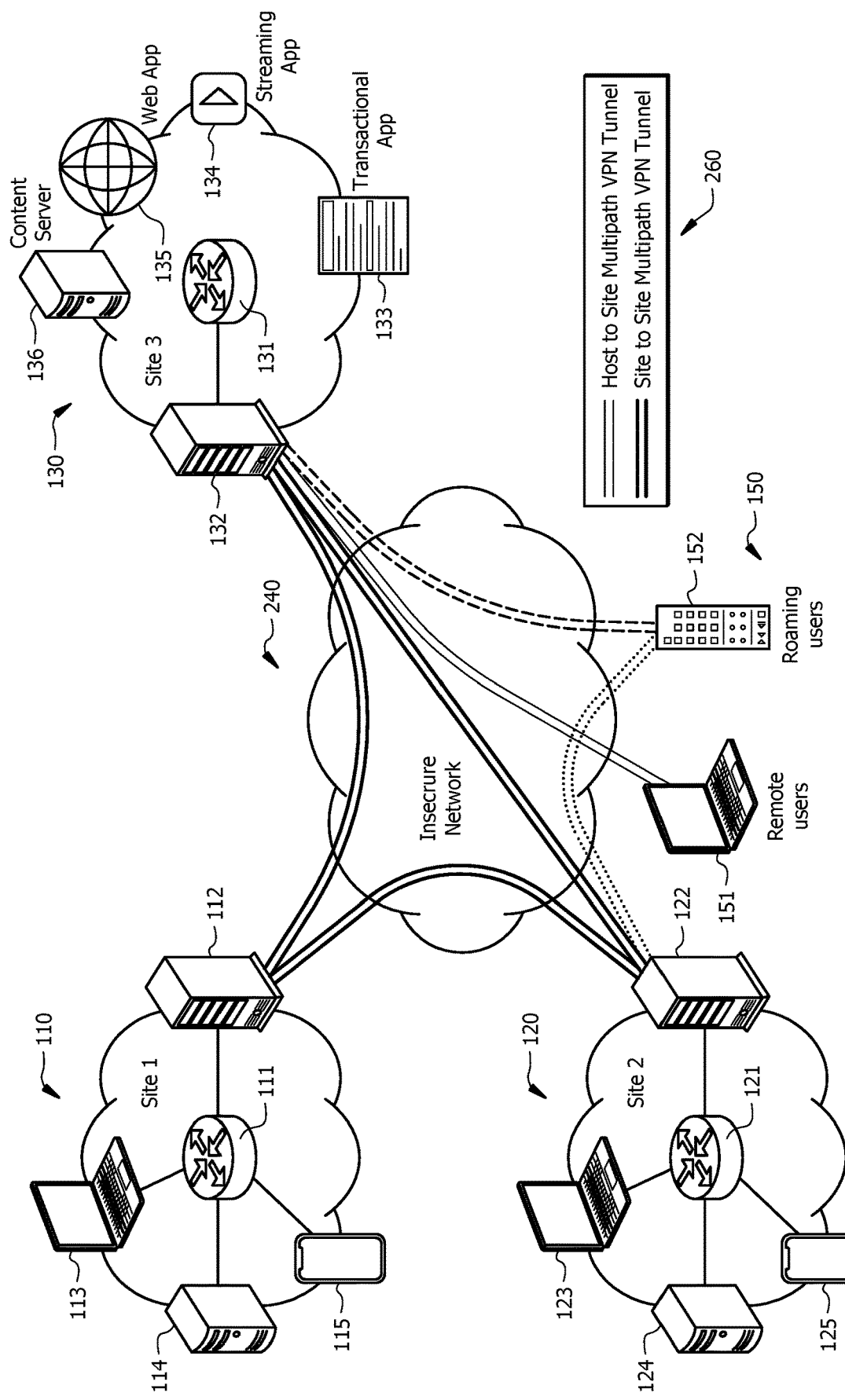
FIG. 2 shows a conventional multipath VPN network architecture.

FIG. 2 shows a conventional multipath VPN network architecture, in which each VPN tunnel connecting a network or a host to a remote network comprises multiple communication paths (240). A communication path is defined as a pair of source and destination IP addresses indicating two endpoints of a sequence of communication links. For example, one communication path between a smart phone and an application server in a data center may correspond to the sequence of a cellular data link from the smartphone to a network operator's cellular tower, a wired communication link from the cellular tower to the operator's core network, and a wired communication link from the operator's core network to the application server in a data center. Another communication path between the smartphone and the application server may correspond to the sequence of a WiFi connection from the smartphone to a WiFi router, a broadband connection from the WiFi router to an ISP's core network, and a wired communication link from the ISP's core network to the application server in a data center. In FIG. 2, the multiple communication paths for Site to Site VPN tunnels are shown as thick lines while the multiple communication paths for Host to Site VPN tunnels are shown as thin lines (260). Host 152 corresponds to a roaming device and dash-line path between device 152 and Site 2 represents the host to network connection at another location or time instance.

Despite the benefits resulted from combining multipath technology such as Multipath Transmission Control Protocol (MPTCP) with tunneling technology such as VPN, there are still limitations with multipath tunneling technology in general and multipath VPN technology in particular:
1. Each endpoint of a VPN tunnel must be equipped with a WAN (wide area network) IP address or can be mapped to a WAN IP address via Network Address Translation (NAT).
2. The same transport protocol, be it MPTCP or MPUDP (Multipath User Datagram Protocol), must be homogeneously applied to all paths. Cross-protocol/hybrid protocol routing is not possible. For example, MPTCP cannot directly work with Bluetooth devices without native IP support.
3. Endpoints that lack native IP support (or layer 3 support) or cannot bind to a WAN IP address are not supported.

Figure 3:
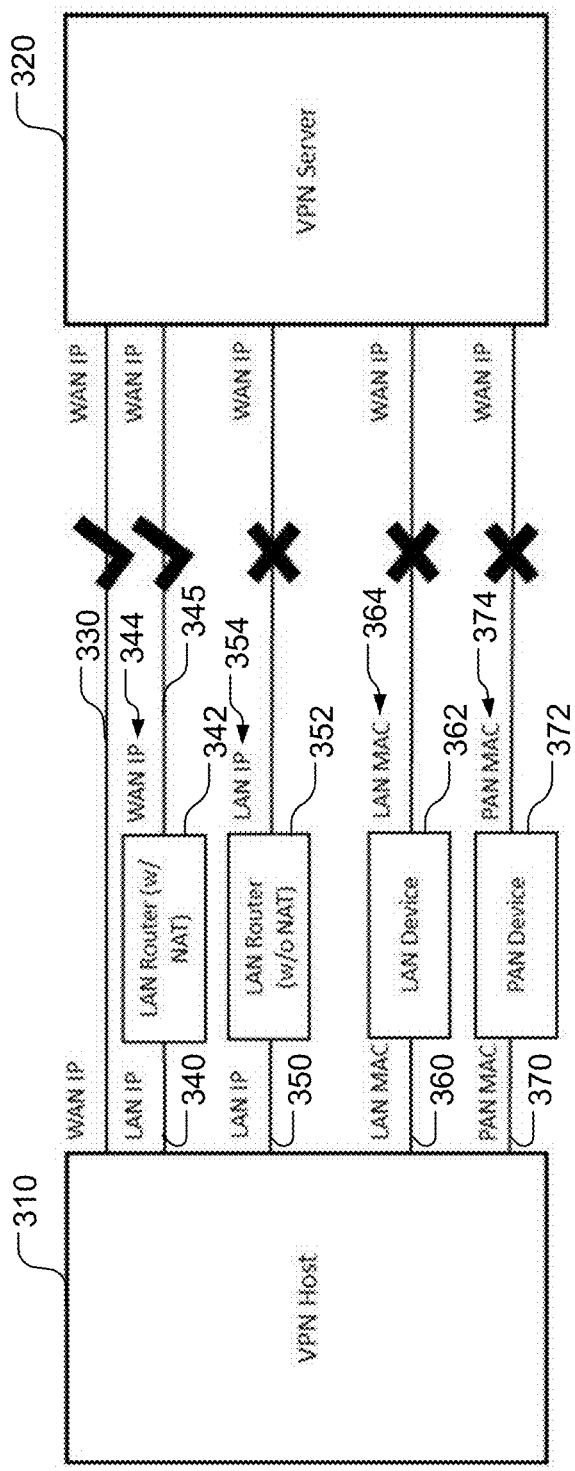
FIG. 3 is a simplified diagram illustrating limitations of current multipath VPN.

In the case where an endpoint is not equipped with a WAN IP address or cannot be mapped to a WAN IP address via NAT, this endpoint will not be able to access WAN. For example, if the host device 151 (e.g. a laptop computer) only has WiFi and Bluetooth interfaces, but it is not connected to a WiFi router, then the VPN tunnel between the host device 151 and Site 2 will not be available. In another example, even though the host device 151 is connected to a WiFi router, regardless of whether or not the WiFi router has WAN connectivity, there can be no more than one communication path between the host device 151 and Site 2 for a VPN tunnel. Therefore, multipath VPN between the host device 151 and Site 2 will not be supported. FIG. 3 shows several examples where (1) LAN (wired or wireless) devices have LAN IP addresses assigned but are behind bridges and switches without NAT capability; (2) Certain LAN/PAN/NFC/IoT devices with only layer 2 connectivity (e.g. Bluetooth, RFID, ZigBee, ZWave) support have MAC addresses but do not have IP addresses due to lack of layer 3 support. Certain WiFi-only devices, such as WiFi-only tablets, SIM-less smartphones, can become WAN accessible via WiFi routers, but these devices only have one interface with indirect WAN connectivity, which is not enough for multipath tunneling.

In FIG. 3, various types of communication links are shown between a VPN host 310 and a VPN server 320. Communication path 330 corresponds to an example where the host and server endpoints each is equipped with a WAN IP address. Therefore, a VPN tunnel can be established via communication path 330. In the second communication path 345, the host 310 is connected to a LAN router with a NAT 342. The LAN IP address 340 can be mapped into a WAN IP address 344 by the LAN router with a NAT 342. Accordingly, communication path 345 can also participate in the VPN tunnel established with communication path 330, making it a multipath VPN tunnel. In the third link, the host 310 is connected to a LAN router without a NAT 352. Since LAN router 352 is not equipped with NAT function, LAN IP address 354 remains non-WAN-accessible and is therefore prevented from establishing a connection with VPN server 320 over WAN. Hence, the network interface at VPN host 310 that binds to LAN IP address 350 cannot be a participant in a VPN tunnel, such as the one established with communication paths 330 and 345. In the fourth link, the host 310 is connected to a LAN device 362. Since LAN device 362 is only addressed via its LAN MAC address 364 and lacks layer 3 addressability, it cannot establish an IP communication path with VPN server 320. Therefore, the network interface at VPN host 310 cannot take part in a VPN tunnel through its LAN-connected device 362 either. In the fifth link, the VPN host 310 is connected to a PAN device 372. Since PAN device 372 is only addressable via its PAN MAC address 374 and lacks layer 3 addressability, it cannot have a direct IP connectivity to VPN server 320. Hence, the corresponding network interface at VPN host 310 is not eligible for being a part of a VPN tunnel through its PAN-connected device 372 in this link.

In summary, today's conventional multipath VPN tunneling technology cannot leverage communications paths that involve endpoints not directly IP addressable. With the proliferation of IoT devices, many of which fall into the category of not being directly IP addressable; it is therefore desirable to develop technologies that can eliminate these limitations.

Figure 4:
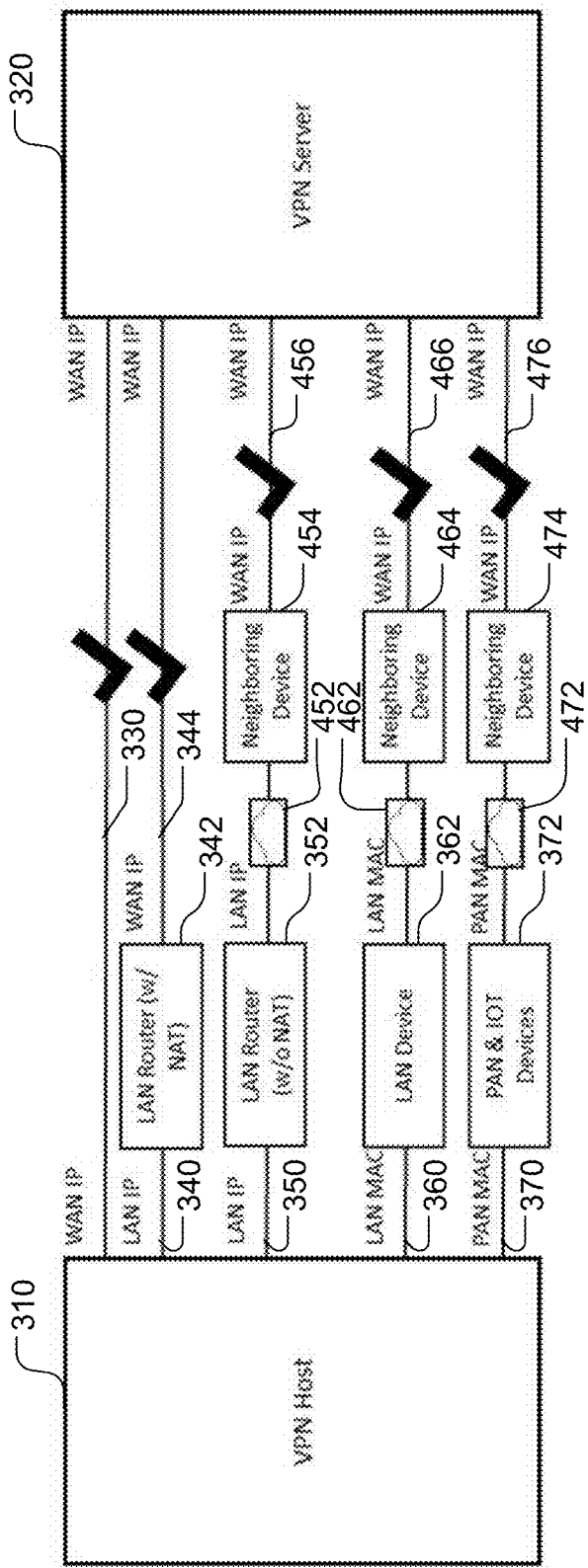
FIG. 4 illustrates an exemplary multipath VPN tunnel with additional paths available for use according to an embodiment of the present invention.

Accordingly, in the present invention, the fog-enabled multipath VPN approach described herein eliminates these limitations by enabling those endpoints not directly IP addressable to become indirectly IP addressable via one or more of their neighboring devices in a fog network. A fog network is formed with multiple geographically proximal fog nodes (or computing devices) interconnected with one another in a wired or wireless fashion. FIG. 4 illustrates a multipath VPN tunnel with additional paths available for use (as compared to FIG. 3), made possible by neighboring devices in a fog network that are directly IP addressable. Examples of endpoint devices not directly IP addressable include SIM-less mobile phones, WiFi-only tablet computers, sensors, wearable devices and IP cameras without cellular connectivity, augmented reality devices, appliances, etc. Examples of neighboring devices that can be made directly IP addressable include smartphones, tablets, connected vehicles, laptop computers, desktop computers, network routers, drones, etc.

The third link in FIG. 3 illustrates an example where VPN cannot be supported since the LAN router without NAT 352 maps the host LAN IP address to another LAN IP address. According to an embodiment of the present invention in FIG. 4, the LAN router without NAT 352 is connected through a fog network 452 to a neighboring device 454 having a WAN IP address, and the fog network 452 comprises features of the present invention. The fourth link in FIG. 3 illustrates an example where VPN cannot be supported since the LAN device 362 maps the host LAN MAC address to a LAN MAC address. According to an embodiment of the present invention in FIG. 4, the LAN device 362 is connected through a fog network 462 to a neighboring device 464 having a WAN IP address. and the fog network 462 comprises features of the present invention. The fifth link in FIG. 3 illustrates an example where VPN cannot be supported since the PAN/IoT devices 372 maps the host PAN MAC address to a PAN MAC address. According to an embodiment of the present invention, the PAN/IoT devices 372 are connected through a fog network 472 to a neighboring device 474 having a WAN IP address. and the fog network 472 comprises features of the present invention. As shown in FIG. 4, VPN can be supported in the third to the fifth examples.

Figure 5:
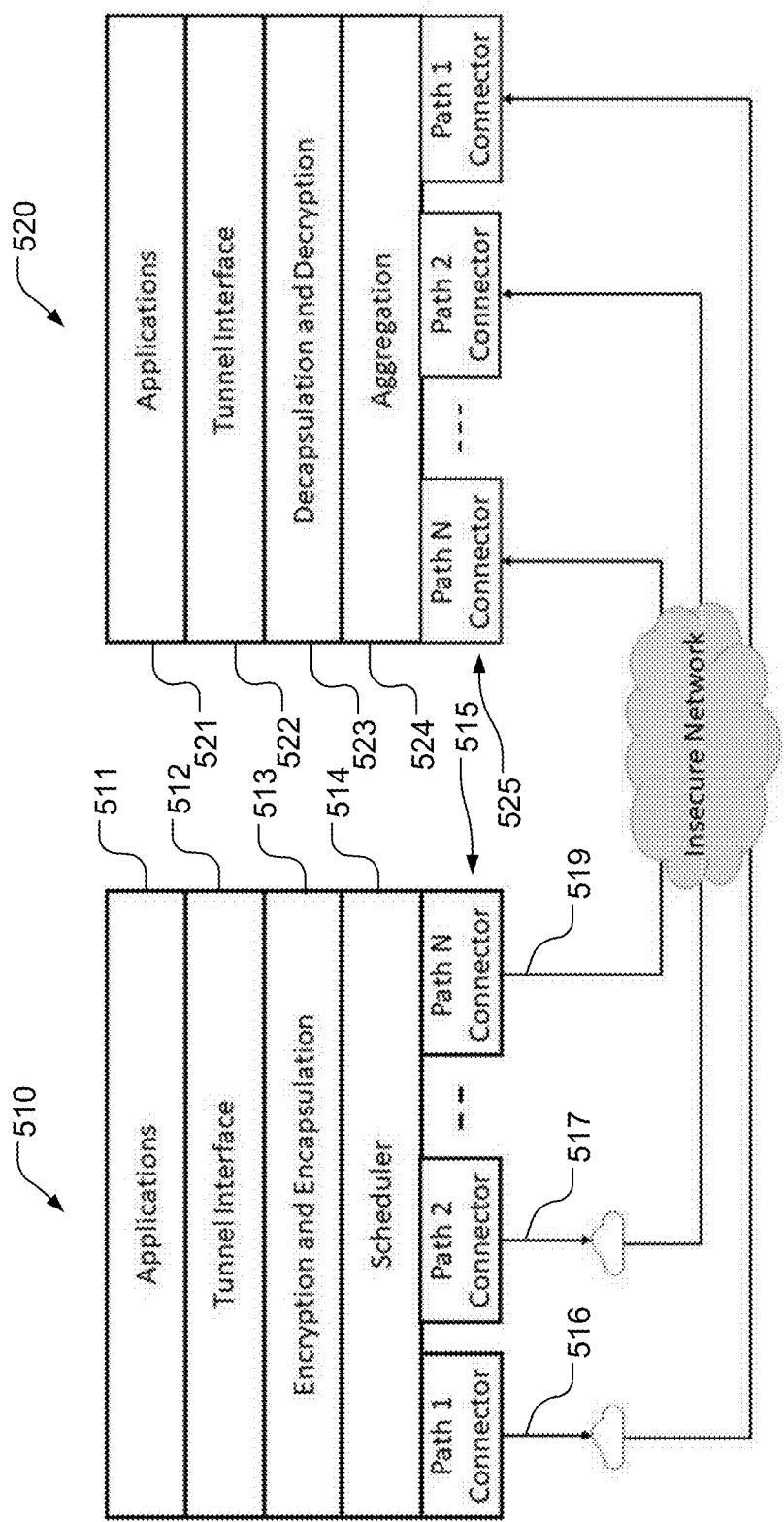
FIG. 5 illustrates an example of the software architecture of a fog-enabled multipath VPN tunnel according to an embodiment of the present invention.

FIG. 5 shows an example of software architecture of a fog-enabled multipath VPN tunnel, where the left side corresponds to the software stack at a source end and the right side corresponds to the software stack at a sink end. In the example, the source-end software stack includes application 511, tunnel interface 512, encryption and encapsulation 513, scheduler 514, and path connectors 515. The sink-end software stack includes the counter-part stacks of the source-end software functions: path connectors 525 (vs path connectors 515), aggregation 524 (vs scheduler 514), decapsulation and decryption 523 (vs encryption and encapsulation 513), tunnel interface 522 (vs tunnel interface 512), and applications 521 (vs applications 511). In order to support the fog-enabled multipath VPN, path connectors 516 and 517 must be fog-aware, namely, capable of communicating with the sink end of the tunnel via fog networks. On the other hand, path connector 519 does not need to be fog-aware since it has a direct communication path with the sink end of the tunnel without going through any fog network.

Based on network configuration and/or automatic runtime network discovery, the multipath VPN software can configure itself with appropriate fog-aware path connectors that know whether and how to connect to the neighboring devices in the fog networks in order to route scheduled data traffic towards the other end of the VPN tunnel. For example, through network discovery, the multipath VPN software detects two fog networks in its proximity as well as their respective connectivity options. Then it configures path connector 516 to connect to one fog network using WiFi Direct and configures path connector 517 to connect to the other fog network using Bluetooth. Furthermore, through path connectors 516 and 517, the multipath VPN software checks if any of the neighboring devices connected to the same fog network has WAN access. If a neighboring device has WAN access, the corresponding path connector is then configured to connect to this neighboring device, which in turn forms a communication path with the sink end. The fog-enabled communication path can then participate in scheduling performed by the scheduler 514 and data traffic can be routed over this path towards the other end of the VPN tunnel.

According to one embodiment of the present invention, each path connector can measure the network characteristics of its path and pass the information to the scheduler for more intelligent scheduling. Depending on the nature and characteristics of a path, the scheduler can decide whether and how each path may participate in the scheduling. A path may be dedicated to data transfer, signaling, extra security, failover, redundancy, or any combination of these functions. The path versatility enabled by fog networking technology therefore adds additional dimensions (such as fog networking protocols, fog node throughput, path latency, battery consumption, and environment parameters such as temperature or humidity, etc.) for the scheduler to factor in. Worth mentioning is the possibility of fog-enabled IoT devices or sensors providing first-hand parameter readings of physical world surrounding them that could make the scheduling decisions more reflective of and reactive to the physical world changes and hence more intelligent. For example, in a natural disastrous area, communication paths with more stable connections and more battery remaining should be chosen in lieu of other paths.

This use of fog networking also brings a unique benefit to data security: because neighboring devices forming a fog network are required to be physically close to each other, data scheduled to go over a fog-enabled path can be subject to extra security measures that can only be performed in the physical world, making the overall VPN solution more secure. For example, a tunnel will not be established unless a neighboring device which provides WAN access is present at a given location (e.g. home or office). One way this can work is to have the neighboring devices registered with a VPN service provider beforehand and to perform a runtime check to ensure that the MAC addresses of the tunnel-participating devices match those of the registered devices before a tunnel can be established. This essentially means that a fog-enabled path can be trusted for tunneling only if those fog-enabling neighboring devices are registered.

Figure 6:
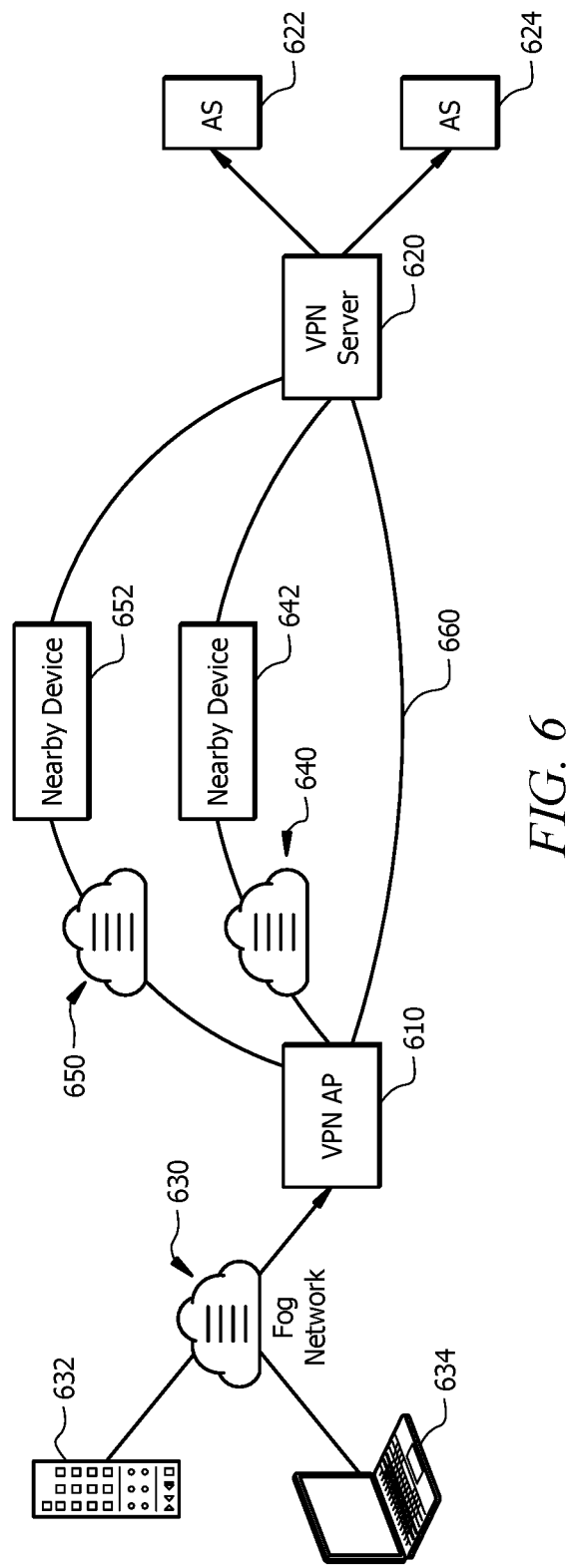
FIG. 6 illustrates an exemplary scenario of a VPN AP (access point) to provide multipath VPN tunnel according to an embodiment of the present invention.

Fog-based multipath VPN tunnel can also enable what is called VPN Access Point (AP), a new use case not found in today VPN services. A VPN AP allows sharing of a fog-enabled multipath VPN tunnel by multiple devices in at least one fog network. Note that the VPN AP node is not restricted to networking routers; a smartphone or a laptop with proper user-space software installed can also serve as a VPN AP. FIG. 6 illustrates an example on how a VPN AP works. In FIG. 6, a VPN AP 610 is connected to fog network 630 on one side and fog networks 640 and 650 on the other side. Through nearby devices 642 and 652, the VPN AP 610 is connected to VPN server 620. In addition, the VPN AP 610 is also connected to VPN server 620 directly through a WAN accessible link 660. The VPN AP 610 along with the fog-enabled multipath tunnel allows host devices 632 and 634 to access the application server (AS) 622 and 624 indirectly according to the present invention. In comparison, conventional VPN services would require that host devices 632 and 634 each obtain a separate VPN tunnel even though the VPN tunnels are between the same pair of endpoints 610 and 620. VPN AP enables new product and service opportunities for VPN service providers.

Figure 7:
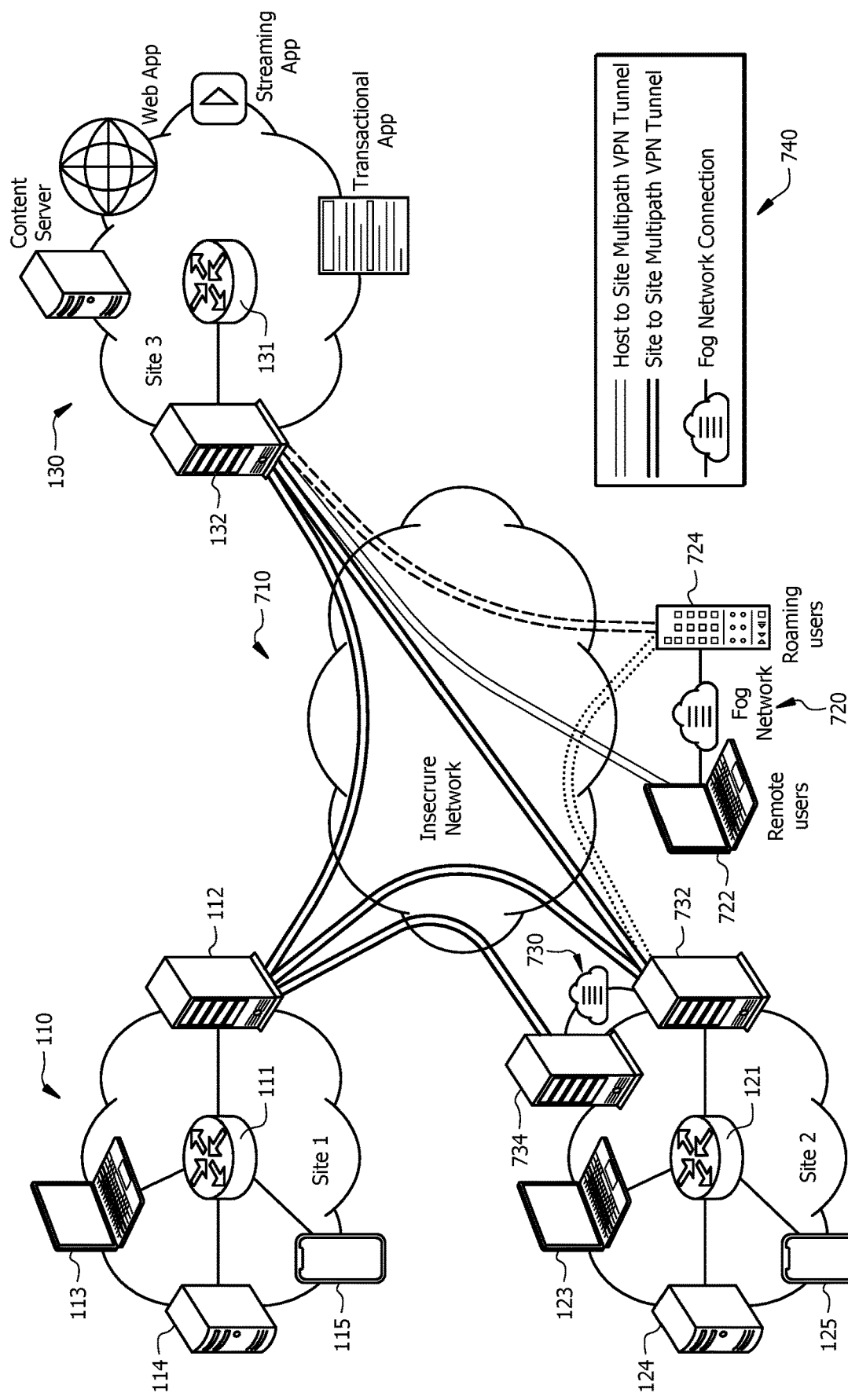
FIG. 7 illustrates an exemplary fog-enabled multipath VPN architecture according to the present invention.

FIG. 7 is a diagram that illustrates a fog-enabled multipath VPN architecture. In FIG. 7, fog networks 720 and 730 are added to allow multipath VPN over insecure network 710 for host devices that do not have sufficient number of network interfaces with direct WAN access or for those that seek to leverage their existing network interfaces to maximize their VPN performance. In this example, the host device 722 (e.g. a laptop computer with WiFi/Bluetooth only network interfaces) cannot support multipath VPN according to the conventional approach because only WiFi network interface can potentially be used in multipath VPN tunneling. On the other hand, a neighboring device 724 (e.g. a smartphone with a cellular data module) has WAN accessibility. According to an embodiment of the present invention, the host device 722 can connect to the neighboring device 724 through the fog network 720 via Bluetooth or WiFi Direct mechanism and a multipath VPN tunnel becomes possible for the host device 722. FIG. 7 also illustrates a case to allow a host to have multipath VPN which is previously not available. In this example, host 734 only has single-path VPN between Site 1 and Site 2. However, a neighboring host 732 supports multipath VPN between Site 1 and Site 2. According to an embodiment of the present invention, with more than one path between Site 1 and Site 2, a multipath VPN tunnel is enabled for the host 734 by connecting it to the host 732 through fog network 730.

Traditionally, VPN customers do not receive the same level of network performance as their non-VPN counterparts, understandably due to the overheads involved in secure tunneling. After all, nothing is free: in order to enjoy the benefits brought by VPN services, VPN customers have to give up on network performance. Therefore, they can live with and are used to sub-optimal network performance such as relatively long network latency and slow response time.

Although network performance is not the primary objective or core functionality of a VPN service, it has become an area of competition among VPN service providers, who try to win over their competitors by keeping network latency relatively low. Their primary means is to deploy as many VPN servers in as many countries and regions as possible so that their customers can more easily find servers local to their regions or countries. This requires lots of investments in underlying networking and server infrastructure and makes VPN service much harder to scale.

With fog-enabled multipath VPN technology, a service provider can cut down the number of servers that need to be deployed for the same level of performance they can offer to their customers. The reduced amount of infrastructure support can be compensated by sharing existing network infrastructure enabled by this technology.

From end users' perspectives, multipath VPN-enabled applications can add additional security to their VPN transactions while enjoying a better network performance. Fog-enablement can further strengthen the security aspect of multiple VPN tunneling, according to an embodiment of the present invention.

However, multipath VPN technology requires that end user devices (such as smartphone, TV, laptop, IoT devices) be equipped with or have direct access to multiple WAN IPs. With the exception of smartphones which usually have direct access to 2 WAN IP addresses (one via WiFi network, and one via cellular network), most devices are designed to use only one WAN IP address at a time, which severely restricts the use of the technology. With fog-enablement, a device can have access to multiple WAN IP addresses via its neighboring devices and leverage all these WAN connections simultaneously.

Moreover, existing multipath technologies such as MPTCP and MPUDP require that VPN tunnel endpoints support TCP/IP protocol stack. Many IoT devices do not natively support IP. Although efforts are underway to bring IP support to these IoT devices, it will take time and cost money, and backward compatibility will remain an issue. With fog-enablement, a device without native IP support can still leverage these technologies via its neighboring devices with native TCP/IP support.

The fog-enabled multipath VPN technology can be deployed as new VPN services or incorporated into existing VPN solutions. Some exemplary features that can benefit or result from this technology are shown as follows:
Secure remote access
Bridging corporate networks located in geographically dispersed office sites
Split VPN
Access to geographically restricted contents/apps
Anonymity of access
Sharing of VPN tunnel among multiple devices in a close proximity The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiments of the present invention as described above may be implemented in various hardware, software codes, or a combination of both. For example, an embodiment of the present invention can be integrated into a SoC (System on a Chip) or program code integrated into communication software to perform the tunneling function described herein. An embodiment of the present invention may also be program code to be executed on a network interface card to perform the processing described herein. The invention may also involve a number of functions to be performed by a computer processor, an AI (Artificial Intelligence) processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:
1. A method for a fog network-enabled multipath virtual private network (VPN) tunnel, comprising:
discovering a neighboring fog network;
connecting with the neighboring fog network using a first communication protocol;
determining whether a first node connected to the neighboring fog network has Wide Area Network (WAN) connectivity and therefore has a WAN IP address and is directly IP addressable;
connecting to the first node in response to determining the first node has WAN connectivity and is directly IP addressable;

establishing a multipath VPN tunnel to a second node via the first node using its WAN IP address and the neighboring fog network, the multipath VPN tunnel comprising at least two IP addressable communication paths; and transmitting to and receiving data from the second node via at least one of the at least two IP addressable communication paths of the multipath VPN tunnel.

2. The method of claim 1, further comprising configuring the first node to form the at least two communication paths of the multipath VPN tunnel via the neighboring fog network.

3. The method of claim 1, further comprising identifying the communication protocol with which to connect to the neighboring fog network, and configuring a path connector to connect to the neighboring fog network using the identified communication protocol.

4. The method of claim 1, further comprising measuring network characteristics of the at least two communication paths and scheduling data transfer via at least one of the at least two communication paths based at least in part on the network characteristics.

5. The method of claim 4, wherein measuring network characteristics includes determining path information selected from the group consisting of fog network protocol, fog node throughput, path latency, battery consumption, environment parameters.

6. The method of claim 1, further comprising enabling at least two endpoint nodes to transmit and receive data via the multipath VPN tunnel established between the first node and the second node.

7. The method of claim 1, further comprising encrypting and encapsulating data for transmitting to the second node via the multipath VPN tunnel.

8. The method of claim 1, further comprising registering with a VPN service provider prior to participating in multipath VPN tunnel formation.

9. A computing device enabling a multipath virtual private network (VPN) tunnel via a fog network, the computing device comprising:
   logic configured to discover a neighboring fog network, in response to a request to form a multipath VPN tunnel;
   logic configured to connect with the neighboring fog network using a first communication protocol;
   logic configured to determine whether a first node connected to the neighboring fog network has Wide Area Network (WAN) connectivity and therefore has a WAN IP address and is directly IP addressable;
   logic configured to connect to the first node in response to determining the first node has WAN connectivity and is directly IP addressable;
   logic configured to establish a multipath VPN tunnel to a second node via the first node using its WAN IP address and the neighboring fog network, the multipath VPN tunnel comprising at least two IP addressable communication paths; and
   logic configured to transmit to and receive data from the second node via at least one of the at least two IP addressable communication paths of the multipath VPN tunnel.

10. The computing device of claim 9, further comprising logic configured to configure the first node to form the at least two communication paths of the multipath VPN tunnel via the neighboring fog network.

11. The computing device of claim 9, further comprising logic configured to identify the communication protocol with which to connect to the neighboring fog network, and configure a path connector to connect to the neighboring fog network using the identified communication protocol.

12. The computing device of claim 9, further comprising logic configured to measure network characteristics of the at least two communication paths and schedule data transfer via at least one of the at least two communication paths based at least in part on the network characteristics.

13. The computing device of claim 12, wherein logic configured to measure network characteristics includes logic configured to determine path information selected from the group consisting of fog network protocol, fog node throughput, path latency, battery consumption, environment parameters.

14. The computing device of claim 9, further comprising logic configured to enable at least two endpoint nodes to transmit and receive data via the multipath VPN tunnel established between the first node and the second node.

15. The computing device of claim 9, further comprising logic configured to encrypt and encapsulate data for transmitting to the second node via the multipath VPN tunnel.

16. The computing device of claim 9, further comprising logic configured to register with a VPN service provider prior to participating in multipath VPN tunnel formation.

17. A non-transitory computer-readable medium having encoded thereon a method for a fog network-enabled multipath virtual private network (VPN) tunnel, comprising:
   a first routine executable to discover a neighboring fog network;
   a second routine executable to connect with the neighboring fog network using a first communication protocol;
   a third routine executable to determine whether a first node connected to the neighboring fog network has Wide Area Network (WAN) connectivity and therefore has a WAN IP address and is directly IP addressable;
   a fourth routine executable to connect to the first node in response to determining the first node has WAN connectivity and is directly IP addressable;
   a fifth routine executable to establish a multipath VPN tunnel to a second node via the first node using its WAN IP address and the neighboring fog network, the multipath VPN tunnel comprising at least two IP addressable communication paths; and
   a sixth routine executable to transmit to and receive data from the second node via at least one of the at least two IP addressable communication paths of the multipath VPN tunnel.

18. The computer-readable medium of claim 17, further comprising a seventh routine executable to configure the first node to form the at least two communication paths of the multipath VPN tunnel via the neighboring fog network.

19. The computer-readable medium of claim 17, further comprising an eighth routine executable to identify the communication protocol with which to connect to the neighboring fog network, and configuring a path connector to connect to the neighboring fog network using the identified communication protocol.

20. The computer-readable medium of claim 17, further comprising a ninth routine executable to measure network characteristics of the at least two communication paths and schedule data transfer via at least one of the at least two communication paths based at least in part on the network characteristics.

21. The computer-readable medium of claim 20, wherein the ninth routine is further executable to determine path information selected from the group consisting of fog network protocol, fog node throughput, path latency, battery consumption, environment parameters.

22. The computer-readable medium of claim 17, further comprising a tenth routine executable to enable at least two endpoint nodes to transmit and receive data via the multipath VPN tunnel established between the first node and the second node.

23. The computer-readable medium of claim 17, further comprising an eleventh routine executable to encrypt and encapsulate data for transmitting to the second node via the multipath VPN tunnel.

24. The computer-readable medium of claim 17, further comprising a twelfth routine executable to register with at least one VPN service provider prior to participating in multipath VPN tunnel formation.

* * * * *